United States Patent
Banerjee et al.

(10) Patent No.: US 10,417,928 B2
(45) Date of Patent: Sep. 17, 2019

(54) HANDWRITTEN HOMEWORK MONITORING USING WEARABLE DEVICE

(71) Applicant: International Business Machines Corporation, Armonk, NY (US)

(72) Inventors: Dipyaman Banerjee, New Delhi (IN); Prasenjit Dey, Bangalore (IN); Vijay Ekambaram, Chennai (IN); Ruhi Sharma Mittal, Bengaluru (IN); Nitendra Rajput, Gurgaon (IN); Sonia Soubam, Imphal (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 15/343,981

(22) Filed: Nov. 4, 2016

(65) Prior Publication Data
US 2018/0130365 A1 May 10, 2018

(51) Int. Cl.
G09B 5/00 (2006.01)
G09B 7/02 (2006.01)

(52) U.S. Cl.
CPC .................... G09B 7/02 (2013.01); G09B 5/00 (2013.01)

(58) Field of Classification Search
CPC ........ G06F 1/163; G06F 3/017; G06F 3/0233; G06F 3/03547; G06F 3/041; G06F 19/00;
(Continued)

(56) References Cited

U.S. PATENT DOCUMENTS 8,602,794 B2 * 12/2013 Cohen ..................... G09B 7/00
434/219
8,725,842 B1   5/2014 Al-Nasser
(Continued)

FOREIGN PATENT DOCUMENTS

CN          104780217 A    7/2015
WO       WO2016110804 A1   7/2016

OTHER PUBLICATIONS

Green, Chris, "Wearable technology: Latest devices allow employers to track behaviour of their workers", The Independent, Aug. 13, 2015, 11 pages, Copy available at: http://www.independent.co.uk/life-style/gadgets-and-tech/news/wearable-technology-latest-devices-allow-employers-to-track-behaviour-of-their-workers-10454342.html.

(Continued)

*Primary Examiner* — Corbett B Coburn
(74) *Attorney, Agent, or Firm* — Ference & Associates LLC (57) ABSTRACT

One embodiment provides a method, including: utilizing at least one processor to execute computer code that performs the steps of: receiving a plurality of student profiles, wherein each of the plurality of student profiles comprises a homework style comprising a pattern of activities performed by a reference student when the reference student is writing by hand, doing homework related to an identified topic; obtaining sensor information, from at least one sensor of a wearable device, the sensor information corresponding to activities performed by a student wearing the wearable device; identifying, using the sensor information, a series of activities performed by the student, wherein the identifying comprises comparing the sensor information to a plurality of models, wherein each model corresponds to an activity; determining if the series of activities corresponds to a homework style of a reference student having a profile similar to that of the student; and providing, if the series of activities do not correspond to the homework style of the reference student having a similar profile, a notification of a deviation from the homework style to a user. Other aspects are described and claimed.

20 Claims, 3 Drawing Sheets

(58) Field of Classification Search
CPC ..... G06Q 10/063114; G06Q 10/06398; G06Q 50/20; G09B 19/00; G09B 7/02; G09B 5/00
See application file for complete search history.

(56) References Cited

U.S. PATENT DOCUMENTS

| | | | |
|---|---|---|---|
| 9,020,848 B1 | 4/2015 | Ridge et al. | |
| 9,544,380 B2* | 1/2017 | Deng | H04L 67/22 |
| 9,747,275 B1* | 8/2017 | Barsness | H04W 4/025 |
| 9,955,286 B2* | 4/2018 | Segal | H04W 4/80 |
| 2002/0146676 A1* | 10/2002 | Reynolds | G09B 5/00 434/362 |
| 2008/0050715 A1* | 2/2008 | Golczewski | G06Q 10/06311 434/350 |
| 2013/0198862 A1* | 8/2013 | Guo | G06F 21/316 726/28 |
| 2014/0255889 A1* | 9/2014 | Grimes | G09B 19/00 434/236 |
| 2014/0310346 A1* | 10/2014 | Deng | H04L 67/22 709/204 |
| 2015/0145760 A1 | 5/2015 | Grimme et al. | |
| 2015/0363795 A1* | 12/2015 | Levy | G06Q 30/0201 705/7.29 |
| 2016/0042654 A1* | 2/2016 | Fieldman | G09B 7/00 434/219 |
| 2016/0125348 A1 | 5/2016 | Dyer et al. | |
| 2018/0049009 A1* | 2/2018 | Barsness | H04W 4/025 |

OTHER PUBLICATIONS

Green, Chris, "Why your boss may soon be giving you a smart watch", NewsMail, Aug. 14, 2015, 2 pages, Copy available at: http://www.news-mail.com.au/news/why-your-boss-may-soon-be-giving-you-smart-watch/2740619/.

* cited by examiner

FIG. 1

| Key-Points/Student Profile | Ideal Pattern for Student | Allowed Deviation | Current Pattern | Anomaly |
|---|---|---|---|---|
| Average Writing Speed (#words or pages per minute) | | | | No |
| Average duration of pause taken between writing (#min_for_pause/#min _for_writing) | | | | Yes, Student is taking long pauses in between writing as compared to ideal pattern. |
| Frequency of erasing (after every X minutes of writing activity, student performs erasing activity) | | | | Yes, the frequency of erasing is very high |
| Number of times erasing activity is performed | | | | Yes, Student is performing Erasing activity frequently |
| ... | | | ... | |

HANDWRITTEN HOMEWORK MONITORING USING WEARABLE DEVICE

BACKGROUND

Many students have to complete homework associated with different topics, for example, reading, math, science, language, and the like. The completion of homework helps to ensure that the student understands the topic being taught. Additionally, an instructor may use the results of homework assignments to identify deficiencies or problems in his or her teaching style. For example, if all the students have poor homework results on a particular topic, the instructor may decide to spend more time teaching that topic. However, when homework is not completed, the instructor may not know if the students are learning the topics as expected. Additionally, when homework is not being completed, it is difficult to know whether the student chose not to complete the homework or whether the student is overwhelmed with too much homework.

BRIEF SUMMARY

In summary, one aspect of the invention provides a method, comprising: utilizing at least one processor to execute computer code that performs the steps of: receiving a plurality of student profiles, wherein each of the plurality of student profiles comprises a homework style comprising a pattern of activities performed by a reference student when the reference student is writing by hand, doing homework related to an identified topic; obtaining sensor information, from at least one sensor of a wearable device, the sensor information corresponding to activities performed by a student wearing the wearable device; identifying, using the sensor information, a series of activities performed by the student, wherein the identifying comprises comparing the sensor information to a plurality of models, wherein each model corresponds to an activity; determining if the series of activities corresponds to a homework style of a reference student having a profile similar to that of the student; and providing, if the series of activities do not correspond to the homework style of the reference student having a similar profile, a notification of a deviation from the homework style to a user.

Another aspect of the invention provides an apparatus, comprising: at least one processor; and a computer readable storage medium having computer readable program code embodied therewith and executable by the at least one processor, the computer readable program code comprising: computer readable program code that receives a plurality of student profiles, wherein each of the plurality of student profiles comprises a homework style comprising a pattern of activities performed by a reference student when the reference student is writing by hand, doing homework related to an identified topic; computer readable program code that obtains sensor information, from at least one sensor of a wearable device, the sensor information corresponding to activities performed by a student wearing the wearable device; computer readable program code that identifies, using the sensor information, a series of activities performed by the student, wherein the identifying comprises comparing the sensor information to a plurality of models, wherein each model corresponds to an activity; computer readable program code that determines if the series of activities corresponds to a homework style of a reference student having a profile similar to that of the student; and computer readable program code that provides, if the series of activities do not correspond to the homework style of the reference student having a similar profile, a notification of a deviation from the homework style to a user.

An additional aspect of the invention provides a computer program product, comprising: a computer readable storage medium having computer readable program code embodied therewith, the computer readable program code executable by a processor and comprising: computer readable program code that receives a plurality of student profiles, wherein each of the plurality of student profiles comprises a homework style comprising a pattern of activities performed by a reference student when the reference student is writing by hand, doing homework related to an identified topic; computer readable program code that obtains sensor information, from at least one sensor of a wearable device, the sensor information corresponding to activities performed by a student wearing the wearable device; computer readable program code that identifies, using the sensor information, a series of activities performed by the student, wherein the identifying comprises comparing the sensor information to a plurality of models, wherein each model corresponds to an activity; computer readable program code that determines if the series of activities corresponds to a homework style of a reference student having a profile similar to that of the student; and computer readable program code that provides, if the series of activities do not correspond to the homework style of the reference student having a similar profile, a notification of a deviation from the homework style to a user.

A further aspect of the invention provides a method, comprising: utilizing at least one processor to execute computer code that performs the steps of: receiving a student profile identifying writing and erasing patterns of a reference student when the reference student is doing homework corresponding to an identified homework topic; obtaining sensor data, from a wearable device, corresponding to a series of activities being performed by a student; identifying a homework topic that the student should be performing homework for; determining if the sensor data indicates a deviation from the writing and erasing patterns corresponding to the homework topic, wherein the determining comprises comparing the sensor data to the writing and erasing patterns of a reference student having a profile similar to the student; and providing, if a deviation exists, an alert to a user of a deviation.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Ensuring that a student completes homework may be difficult for parents, instructors, caregivers, and the like (referred to herein as "caregiver" for ease of readability). Current methods require that the caregiver monitors the homework habits of the student, usually by watching the student, checking on the student, or some other type of physical monitoring. A benefit to a caregiver monitoring the student is that the caregiver can determine if the student is properly completing the homework, for example, if the student is having difficulty with homework, copying homework, performing homework per a schedule, and the like. However, it is not always feasible for a caregiver to monitor the student. For example, if the caregiver is at work when the student should be completing the homework, the caregiver is unable to monitor the student.

Accordingly, without monitoring by the caregiver the student may perform poorly, for example, the student may not complete the homework, may copy the homework from another source, having difficulty understanding the homework without a resource to assist the student, and the like. Additionally, some students may be unwilling to request assistance in completing the homework if the student is having difficulty completing the homework, even though a caregiver may be available. The caregiver, without closely monitoring the student may not realize the student is having difficulty because the student does not request assistance. Additionally, without a caregiver monitoring the student, it may be difficult to know if the student is overwhelmed by too much homework. Thus, without monitoring, the student may not complete the homework, may become frustrated, may copy from another source, and the like.

Accordingly, an embodiment provides a method of automatically monitoring a student allowing the system to determine if the student is performing handwritten homework as expected. An embodiment may receive a plurality of student profiles which identifies a homework style of a reference student. The homework style may be specific to an identified topic. For example, a student's homework style may be different when he or she is completing homework for math as opposed to reading. The homework style may include a pattern of activities that a student performs when handwriting the homework related to the topic. The activities may include, for example, erasing, writing, and the like. Thus, for example, the homework style may identify how many times a student erases while performing homework of a particular topic.

The system may obtain sensor information from at least one sensor of a wearable device, for example, a smart watch, fitness band, bracelet, and the like. The sensor information may correspond to an activity being performed by a student. For example, the sensor information may identify a movement, tilt, elevation, and the like, of a student's hand or wrist. The system may then identify the activity or activities that are being performed by the student. In one embodiment, identifying the activity may include comparing the sensor information to a plurality of models, where each model corresponds to a different activity. Upon identifying a match, the system may identify the activity being performed by the student. For example, the sensor information may include a speed of movement and an angle of the student's wrist that can be correlated to the student performing the activity of writing.

The system may then determine if the series of activities that have been performed by the student correspond to the homework style of a reference student having a profile similar to the student. For example, the homework style of the reference student performing math homework may identify that the reference student erases five times while completing an hour's worth of math homework. However, based upon the identified series of activities, the system has identified that the student has erased ten times in a half hour span while performing math homework. As in the example above, if the series of activities does not match the homework style, the system may provide a notification of the deviation to another user, for example, the caregiver of the student. The notification may be generic, for example, a notification that a deviation has been identified, or specific, for example, a notification that identifies the student is having difficulty with the homework.

Such a system provides a technical improvement over current systems for monitoring a student while performing homework. The systems and methods described herein provide a technique for monitoring the student's performance while completing homework that does not require a caregiver to be physically monitoring the student. Accordingly, the system provides a technique that can detect when a student may be copying his or her homework, when the student is not following a homework schedule, and the like. Additionally, the system provides a method for identifying when a student is having difficulty with a particular homework assignment, without the student having to request assistance. Additionally, the system provides a technique for identifying if a student is overwhelmed with too much homework. Thus, the systems and methods as described herein provide for an automated technique for monitoring a student and making inferences about the student's behavior while he or she is completing homework.

Figure 1:
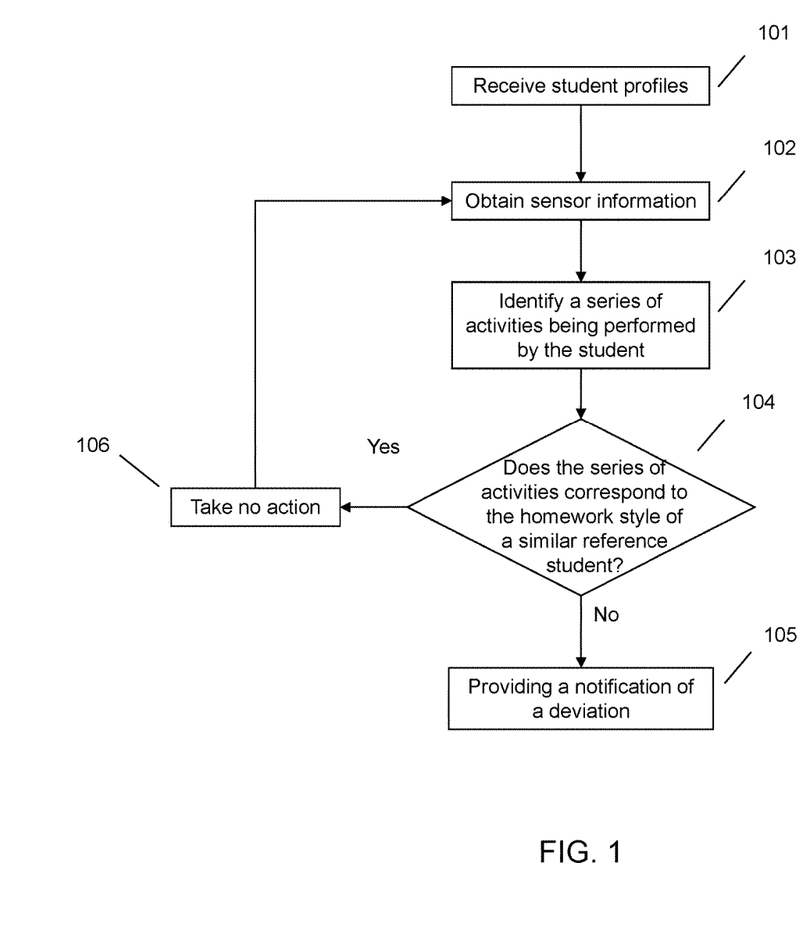
FIG. 1 illustrates a method of monitoring a student handwriting homework using a wearable device.
Figure 2:
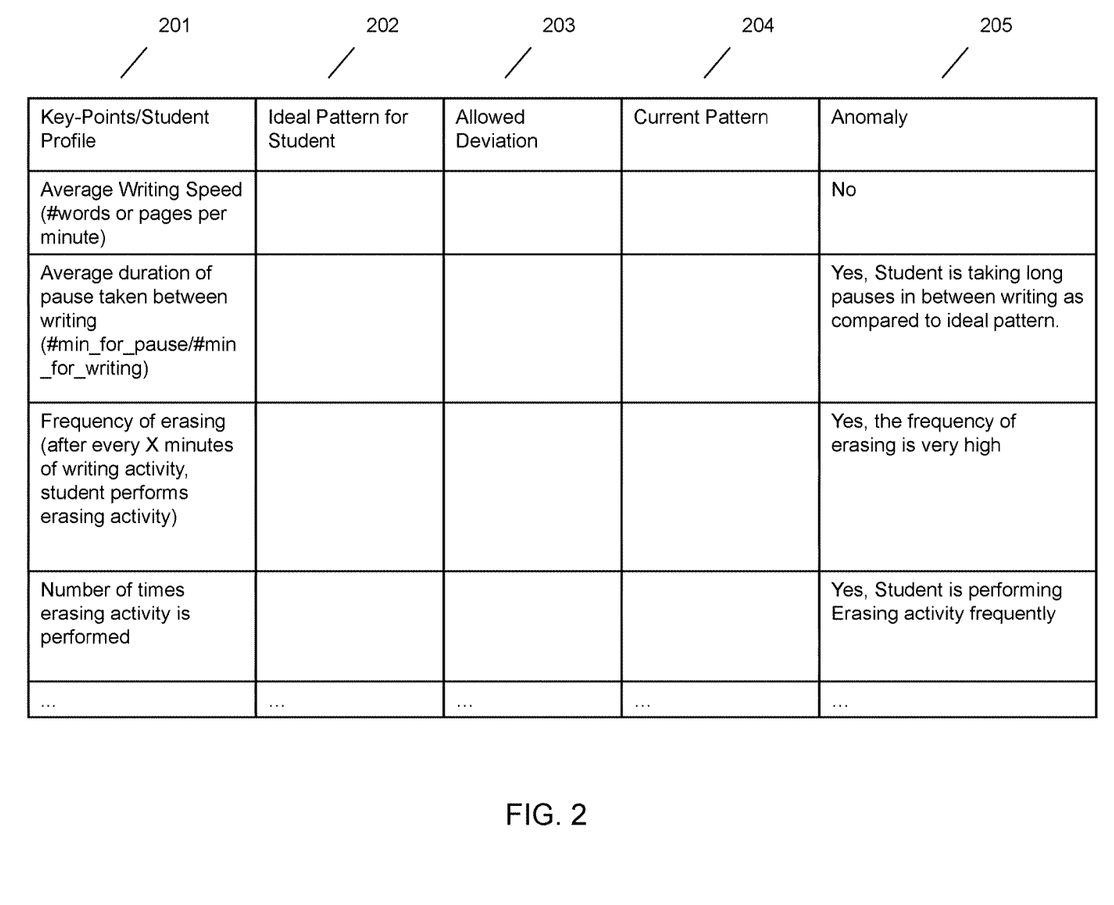
FIG. 2 illustrates an example student profile with detected activities compared to ideal patterns.

Referring now to FIG. 1, an embodiment may receive a plurality of student profiles. A student profile may include a homework style of a student when the student is handwriting (e.g., using a pen and paper, using a pencil, drawing, using a stylus and touch screen, etc.) homework related to an identified topic. The homework style may comprise a pattern of activities that the student performs while performing the homework associated with the topic. The pattern of activities within the homework style may, but do not necessarily, include a timing component. For example, the pattern of activities may identify that a student erases six times in an hour span, but may not necessarily identify that the student erases every ten minutes. As another example, the pattern of activities may identify that the student pauses every seven minutes.

The homework style may include information such as the writing speed of the student, how many pauses the student takes while writing a particular homework topic, how many times the student erases while performing the homework, how frequently the student erases, and the like. The pattern of activities may or may not identify a sequential order of the activities. For example, the pattern of activities do not necessarily identify that the student writes for three minutes, erases for one minutes, writes for five minutes, and then erases for thirty seconds. Rather, the pattern of activities may identify an average frequency of activities, an average number of times a particular activity is performed, characteristics of the student while completing the homework, and the like. In other words, the homework style may identify an average or ideal pattern or style that the student carries out while completing the homework for a particular topic.

As can be understood, the student may have multiple homework styles for different topics. For example, the student may quickly finish math homework with little erasures, while the same student is not as fast when finishing science home and has many erasures. Additionally, different students may have different homework styles. Thus, homework styles may be trained for each student in each topic.

Identifying a homework style may include performing activities during a training mode. For example, as the student performs homework for an identified topic, sensor information may be captured that is used to train and generate the homework style. A user may then manually label the training data with the student and the homework topic. Additionally, anytime the student is performing homework for an identified topic, the system can update the homework style of the student. Thus, as the homework style of the student varies throughout the year, for example, as the topic matter changes and may become more difficult or easier, the system can adjust the ideal homework style to reflect the changes in the student's homework style.

The captured sensor information can be used to build models corresponding to a particular activity (e.g., erasing, writing, reading, etc.). The sensor pattern that is detected when a student is performing a known activity may be stored into a model. The models can then be associated with the activity. As more models are generated, the models may be fine-tuned to create an average model. For example, the student may not erase in the same way every time. However, the erasing activity of the student may share similar characteristics every time. Thus, the models may be generated to more accurately identify when a student is performing a particular activity, even if the activity is not performed in the same way or does not result in the same sensor information every time.

The student profile may also contain other information related to characteristics of the student. For example, the student profile may include the student's average writing speed, the student's academic record (e.g., grades in current and past subjects), student's behavioral record (e.g., shy, lazy, reliable, etc.), the student's age, and the like. The information contained in the student profile may be used to assist in identifying a homework style of the student. For example, a lazy student may be more likely to not do homework. As another example, a shy student may be more likely to not ask for assistance even when he or she does not understand or is having difficulty with the homework.

At 102, an embodiment may obtain sensor information from at least one sensor of a wearable device. Example wearable devices may include smartwatches, armbands, bracelets, and the like. The wearable devices may have many different types of sensors, for example, accelerometers, gyroscopes, compasses, magnetometers, pressure sensors, electromyography sensors, and the like. The sensors may be able to identify different movements of the device, for example, tilt, motion, elevation, rotation, and the like. The sensor information may be obtained while a user is performing activities. In other words, the sensor information may correspond to activities performed by the student.

Using the sensor information the system may identify one or a series of activities performed by a student at 103. To identify the activities, the system may classify or predict the activities using the training data or models that were previously created. For example, the system may compare the sensor information being captured while the student is performing an activity to the created models. When the captured sensor information matches or is found to be similar to one of the models, the system may predict or infer that the student is performing the activity associated with the matched or similar model. For example, if the gyroscope and accelerometer information that is captured while the student is performing an activity matches the model for writing, the system may predict that the student is performing the activity of writing. This predicting may occur for the entire series of activities being performed by the student.

At 104 the system may determine whether the identified series of activities matches or is similar to the homework style of a reference student for an identified topic. To identify the appropriate reference student, the system may compare the characteristics of the target student to characteristics of the reference students. For example, the system may identify the target student as a shy student and may then identify a student profile to be used as a reference as belonging to a shy student. As another example, the system may capture some activities of the target student and compare them to activities of the reference students. The selected reference student may then be the one having a style most similar to the target student. The reference student may not be the same for every homework topic of the target student. For example, the target student's activities for math may be compared to reference student A. However, for reading the student's activities may be compared to reference student B. The system may compare the student profile of the target student to the student profiles that were obtained at 101. Once a reference student profile is identified, the system may determine whether the target student's series of activities match the homework style of the reference student.

In one embodiment, the system may identify the topic the student is working on by obtaining additional information identifying the topic. For example, the system may receive a signal from an identification tag (e.g., radio frequency identification (RFID) tag, near field communication tag, transmitter, etc.) which is attached to or connected to a book or other material associated with the topic. For example, as an RFID tag attached to a book comes in closer proximity to the wearable device, the strength of the signal being emitted from the tag may appear stronger to the wearable device. The system may then read the signal to identify the tag and determine the topic associated with the material, for example, using a look-up table, parsing the identification information, and the like. The system may then infer that the student must have a particular piece of homework material and must be performing homework for that topic.

The system may identify the topic using other techniques. For example, the student or caregiver may manually provide the topic to the system. A user may scan a barcode, quick response (QR) code, or other machine readable optical label attached to material for or associated with a particular topic. As another example, the system may receive a homework schedule of the student. Based upon the current time and the homework schedule, the system may infer that the student is or should be performing homework associated with the topic corresponding to the current time.

To determine whether the series of activities corresponds to the homework style of the reference student for the identified activity, the system may compare the activities to the reference student's homework style. For example, referring to FIG. 2 which illustrates an example student profile and comparison table, the student profile and key-points may be provided at 201. The ideal pattern or homework style (e.g., the homework style of the reference student, etc.) may be identified at 202. For example, the average writing speed of the reference student may be twenty words per minute. Each student profile point 201 may have an allowed deviation 203 associated with it. Using the example above, the average writing speed is twenty words per minutes, but the deviation may be +/−five words per minute. Thus, if the student only writes fifteen words per minute, the system would identify that as within the acceptable or identified range or threshold.

The current pattern 204 of the student may then be compared to the ideal pattern 202 including the allowed deviation 203. If the current pattern 204 is within the ideal pattern 202 including the allowed deviation 203, the system may determine that the series of activities does correspond to the homework style of the student for the identified topic. If, however, the current pattern 204 is outside the ideal pattern 202 including the allowed deviation 203 or threshold, the system may determine that the series of activities does not correspond to or match the homework style of the reference student for the identified topic. It should be understood that the table of FIG. 2 is merely an example to illustrate the systems and methods described herein. The system may not use a table to make the comparison.

If the series of activities does correspond to the homework style, the system may take no action at 106 and continue to monitor the student activities at 102. If, however, the series of activities does not correspond to the homework style, the system may provide a notification of the deviation from the homework style to a user (e.g., student, caregiver, etc.). The notification may include a generic notification, for example, a notification that a deviation was identified. Alternatively, the notification may include a specific notification which identifies the particular deviation and an inferred reason for the deviation.

As one example, assume a student Alex is completing homework associated with a science topic. While Alex is performing the homework, the system identifies that Alex is taking long pauses between writing activities as compared to the homework style of Alex, or the reference student. It should be understood that the reference student could be the student completing the homework, or another student who has a similar homework style to the student. The system also identifies that the frequency that Alex is performing the erasing activity is high as compared to the ideal pattern. Additionally, the system identifies that the number of times Alex has erased indicate that Alex is spending most of the time performing the erasing activity. Based upon the identified anomalies, the system may infer that Alex is confused and is having difficulty understanding the homework. Additionally, Alex may need assistance. Accordingly, the system may provide a notification to a caregiver that Alex is confused and needs assistance. The frequency of erasing is only one aspect of an erasing style. Accordingly, an embodiment may identify that the erasing style of Alex is not the same as the reference student even if the frequency of erasing does not change. For example, the system may identify a duration of erasing, a change in pressure of erasing, different angles of erasing, and the like.

As another example, assume that the system has received a copy of a student Andrew's homework schedule. The homework schedule has identified that Andrew should be completing homework associated with a language topic. During the time slot that has been identified as homework time for the language topic, the system identifies that Andrew's writing speed as compared to the ideal writing speed is very slow. Also, the system has identified that Andrew is taking long pauses between writing activities as compared to the reference student's homework style. The system also identifies that the frequency of erasing and the number times that Andrew performs the erasing activity are within the range of the ideal pattern. The system may also identify that Alex is performing an activity that is not related to performance of homework (e.g., playing, sleeping, running, etc.). Based upon the identified anomalies and possible identification of other activities, the system may infer that Andrew is not following the homework schedule. Accordingly, the system may provide a notification to a caregiver that Andrew is not performing homework per the homework schedule. As is understood by one skilled in the art, writing speed is only one aspect of a writing style. Thus, for example, rather than identifying that the speed of writing has changed, the system may identify an increase in pauses between words, longer duration of pauses, changes in angles associated with the writing implement, identification that the student is drawing rather than writing, and the like.

As a final example, assume that a student Mary is performing homework associated with a history topic. While Mary is performing the homework, the system identifies that Mary is writing very quickly as compared to the homework style of Mary, or a reference student, while working on history homework. Additionally, the system identifies that the duration and frequency of pauses between words is very low when compared with the ideal pattern. The system also identifies that the frequency that Mary performs the erasing activity is low as compared to the homework style. Also, the system identifies that Mary is spending much less time performing the erasing pattern as compared with the ideal pattern. Based upon the identified anomalies, the system may infer that Mary is copying homework. Accordingly, the system may provide a notification to a caregiver that Mary is copying homework. As stated above, the frequency of writing is not the only parameter of writing style and the system may identify that the student is copying the homework based upon other characteristics of the writing or erasing style.

Figure 3:
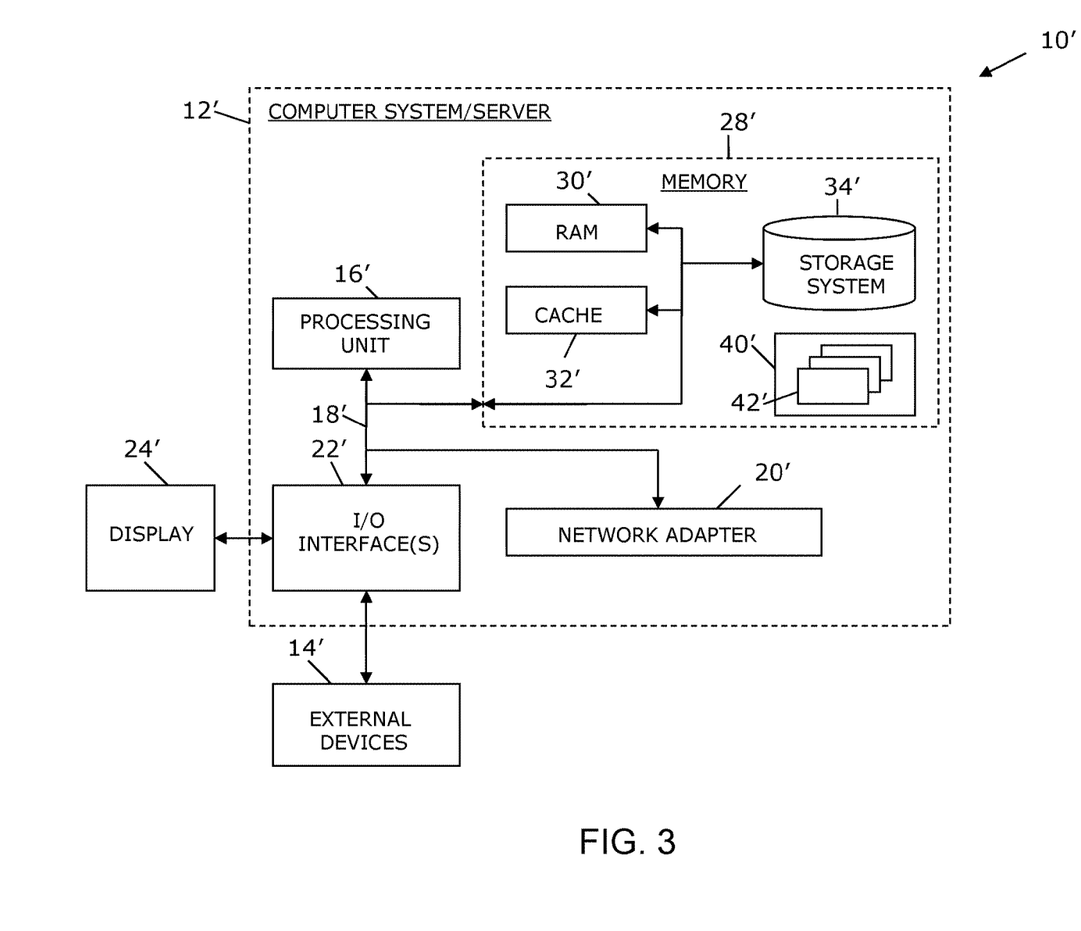
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving a plurality of student profiles, wherein each of the plurality of student profiles corresponds to a student designated as a reference student and identifies characteristics of the reference student, wherein each of the student profiles comprises a homework style comprising a pattern of activities, captured during a training mode using sensors, performed by the corresponding reference student when the reference student is writing, by hand, doing homework related to an identified topic;
thereafter obtaining sensor information, from at least one sensor of a wearable device, the sensor information corresponding to sensor information received by the wearable device while a target student performs activities wearing the wearable device;
identifying a topic the target student is working on;
identifying, using the sensor information, a series of activities performed by the target student, wherein the identifying comprises comparing the sensor information to a plurality of activity models and predicting an activity that the student is performing based upon the comparison, wherein each model corresponds to an activity associated with handwriting homework and identifies characteristics of the corresponding activity;

identifying, using the student profiles, a reference student having a homework style for the identified topic corresponding to a homework style for the identified topic of the target student, wherein the identifying comprises comparing characteristics of the target student to characteristics of the plurality of reference students and identifying a reference student having at least a subset of same characteristics as the target student;

determining that the series of activities does not match the homework style of the identified reference student for the identified topic; and providing, responsive to determining that the series of activities do not match the homework style of the identified reference student, a notification of a deviation from the homework style to a user other than the target student.

2. The method of claim 1, comprising receiving sensor information corresponding to an activity performed during a training mode and generating a model corresponding to the activity performed during the training mode.

3. The method of claim 1, comprising receiving a homework schedule for the target student.

4. The method of claim 3, wherein the identified at least one activity comprises an activity not related to the target student performing homework and wherein the notification is provided based upon the target student not performing homework during a time identified as homework time per the homework schedule.

5. The method of claim 1, wherein the determining comprises comparing the sensor information to the at least one model and identifying that the sensor information is outside a predetermined threshold as compared the at least one model.

6. The method of claim 1, wherein the activity comprises erasing and wherein the notification is provided when an erasing style is different from the reference student homework style.

7. The method of claim 1, wherein the activity comprises writing and wherein the notification is provided when a writing style is different from the reference student homework style.

8. The method of claim 1, further comprising obtaining information identifying a homework topic.

9. The method of claim 8, wherein identifying a homework topic comprises receiving a signal from an identification tag attached to a book corresponding to the homework topic.

10. The method of claim 1, wherein the student profile identifies a writing speed of the reference student.

11. The method of claim 1, wherein the student profile identifies an age of the reference student, a behavior profile of the reference student, and an academic record of the reference student.

12. An apparatus, comprising:
at least one processor; and
a non-transitory computer readable storage medium having computer readable program code embodied therewith and executable by the at least one processor, the computer readable program code comprising:
computer readable program code that receives a plurality of student profiles, wherein each of the plurality of student profiles corresponds to a student designated as a reference student and identifies characteristics of the reference student, wherein each of the student profiles comprises a homework style comprising a pattern of activities, captured during a training mode using sensors, performed by the corresponding reference student when the reference student is writing, by hand, doing homework related to an identified topic;
computer readable program code that thereafter obtains sensor information, from at least one sensor of a wearable device, the sensor information corresponding to sensor information received by the wearable device while a target student performs activities wearing the wearable device;
computer readable program code that identifies a topic the target student is working on;
computer readable program code that identifies, using the sensor information, a series of activities performed by the target student, wherein the identifying comprises comparing the sensor information to a plurality of activity models and predicting an activity that the student is performing based upon the comparison, wherein each model corresponds to an activity associated with handwriting homework and identifies characteristics of the corresponding activity
computer readable program code that identifies, using the student profiles, a reference student having a homework style for the identified topic corresponding to a homework style for the identified topic of the target student, wherein the identifying comprises comparing characteristics of the target student to characteristics of the plurality of reference students and identifying a reference student having at least a subset of same characteristics as the target student;
computer readable program code that determines that the series of activities does not match the homework style of the identified reference student for the identified topic; and
computer readable program code that provides, responsive to determining that the series of activities do not match the homework style of the identified reference student, a notification of a deviation from the homework style to a user other than the target student.

13. A computer program product, comprising:
a non-transitory computer readable storage medium having computer readable program code embodied therewith, the computer readable program code executable by a processor and comprising:
computer readable program code that receives a plurality of student profiles, wherein each of the plurality of student profiles corresponds to a student designated as a reference student and identifies characteristics of the reference student, wherein each of the student profiles comprises a homework style comprising a pattern of activities, captured during a training mode using sensors, performed by the corresponding reference student when the reference student is writing, by hand, doing homework related to an identified topic;
computer readable program code that thereafter obtains sensor information, from at least one sensor of a wearable device, the sensor information corresponding to sensor information received by the wearable device while a target student performs activities wearing the wearable device;
computer readable program code that identifies a topic the target student is working on;
computer readable program code that identifies, using the sensor information, a series of activities performed by the target student, wherein the identifying comprises comparing the sensor information to a plurality of activity models and predicting an activity that the student is performing based upon the comparison, wherein each model corresponds to an activity associated with handwriting homework and identifies characteristics of the corresponding activity computer readable program code that identifies, using the student profiles, a reference student having a homework style for the identified topic corresponding to a homework style for the identified topic of the target student, wherein the identifying comprises comparing characteristics of the target student to characteristics of the plurality of reference students and identifying a reference student having at least a subset of same characteristics as the target student;

computer readable program code that determines that the series of activities does not match the homework style of the identified reference student for the identified topic; and computer readable program code that provides, responsive to determining that the series of activities do not match the homework style of the identified reference student, a notification of a deviation from the homework style to a user other than the target student.

14. The computer program product of claim 13, comprising receiving sensor information corresponding to an activity performed during a training mode and generating a model corresponding to the activity performed during the training mode.

15. The computer program product of claim 13, comprising receiving a homework schedule for the target student.

16. The computer program product of claim 15, wherein the identified at least one activity comprises an activity not related to the target student doing homework and wherein the notification is provided based upon the target student not doing homework during a time identified as homework time per the homework schedule.

17. The computer program product of claim 13, wherein the activity comprises erasing and wherein the notification is provided when an erasing style is different from the reference student homework style.

18. The computer program product of claim 13, wherein the activity comprises writing and wherein the notification is provided when a writing style is different from the reference student homework style.

19. The computer program product of claim 13, further comprising obtaining information identifying a homework topic by receiving a signal from an identification tag attached to a book corresponding to the homework topic.

20. A method, comprising:

utilizing at least one processor to execute computer code that performs the steps of:

receiving a student profile identifying writing and erasing patterns, captured during a training mode using sensors, of a reference student when the reference student is doing homework corresponding to an identified homework topic, wherein the student profile identifies characteristics of the reference student;

obtaining sensor data, from a wearable device, corresponding to sensor information received by the wearable device while a target student performs a series of activities while wearing the wearable device;

identifying a homework topic that the target student should be performing homework for;

identifying, using the student profiles, a reference student having a homework style for the identified homework topic corresponding to a homework style for the identified homework topic of the target student, wherein the identifying comprises comparing characteristics of the target student to characteristics of the reference student and identifying a reference student having at least a subset of same characteristics as the target student;

determining that the sensor data indicates a deviation from the writing and erasing patterns corresponding to the homework topic of the identified reference student, wherein the determining comprises comparing the sensor data to the writing and erasing patterns of the identified reference student; and providing, responsive to determining that a deviation exists, an alert of the deviation to a user other than the student.

* * * * *